April 3, 1928. 1,664,953
E. D. TILLYER
DIAGNOSTIC INSTRUMENT FOR THROWING A BEAM OF LIGHT INTO THE EYE
Filed Nov. 5, 1923
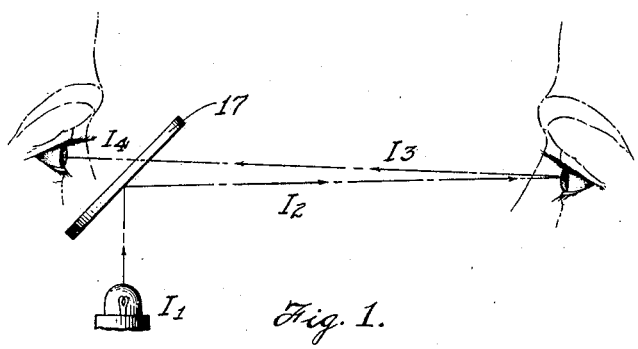
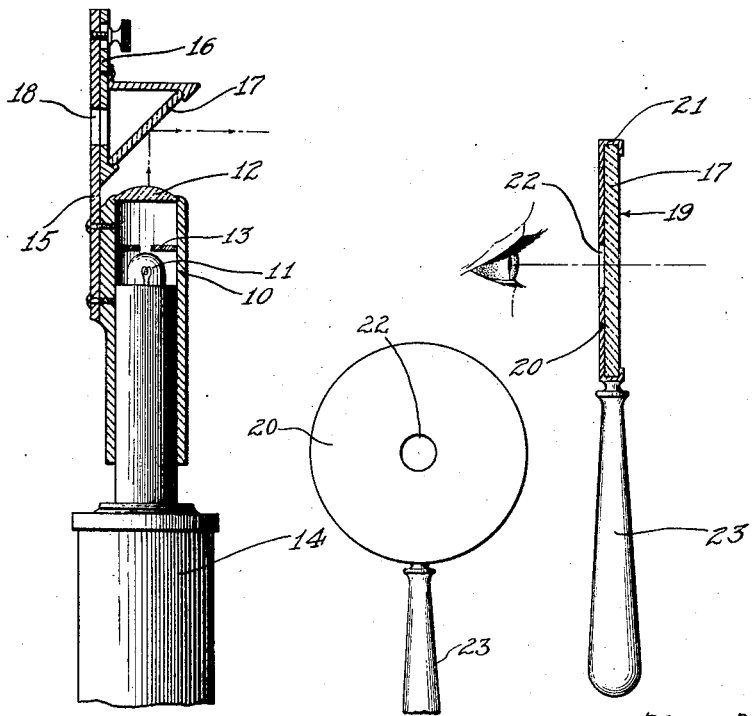
INVENTOR
E. D. TILLYER
BY
Harry H. Styll.
ATTORNEY Patented Apr. 3, 1928.

1,664,953

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

DIAGNOSTIC INSTRUMENT FOR THROWING A BEAM OF LIGHT INTO THE EYE.

Application filed November 5, 1923. Serial No. 672,926.

This invention relates to improvements in eye testing instruments and has particular reference to retinoscopes or other similar instruments whereby the pupil of the patient's eye is illuminated by a beam of light and the observations made by the operator.

Prior to my invention, retinoscopes have been provided with a reflecting mirror over the center of which is a small peep-hole of from $\frac{1}{16}$ to $\frac{3}{32}$ of an inch in diameter, which is much smaller than the pupil of the observer's eye. This peep-hole breaks up the reflecting surface of the mirror and tends to cast a false shadow on the eye of the patient and unless the operator is very skillful in using the device and in allowing for this false shadow, inaccurate refractions will result. Furthermore, in looking through this small opening, the operator is obliged to squint, which causes a great strain on his eye, sufficient to cause injury to the busy refractionist. In those prior art devices using such a sight opening, the source of illumination has been made the basis of work rather than the patient's eye and the returned image to the eye of the observer is larger than the pupil of the observer's eye. With my invention, I make the patient's eye the basis of the work without any undue discomfort to the patient.

One of the principal objects of the invention is to provide a retinoscope wherein the maximum percentage of light from the patient's eye is transmitted to the observer's eye.

Another object of the invention is to provide such an instrument which will not cast a false shadow on the eye of the patient being examined.

A further object is to provide a device of this character which will be extremely simple in construction, efficient in service, and an improvement in the art.

Other objects and advantages will be apparent from the following description taken in connection with the accompanying drawings wherein similar reference characters are used to designate corresponding parts throughout the several views.

In the drawings:

Figure 1 is a diagrammatic view illustrating my retinoscope in use.

Figure 2 is a vertical sectional view through one form of retinoscope embodying my invention.

Figure 3 is a sectional view through another form of my invention.

Figure 4 is a rear elevation of same.

Referring now particularly to Figure 2, I provide a retinoscope having a tubular portion 10 wherein is mounted an illuminating bulb 11, the tube being open at its upper end and provided with a lens 12. Disposed between the lens 12 and the bulb 11 is a diaphragm 13 which is used to concentrate the light into a fine beam, and which may be secured within the tube in any suitable manner. The tube 10 is supported upon the usual handle member 14 which may, if desired, carry the battery or other suitable source of power for the light bulb 11.

Carried by the tube 10 is an upstanding plate 15 having mounted on its front side a reflector bracket 16 which carries the reflector 17 which is the essence of my invention. In this form of the invention the reflector 17 is angularly disposed above the lens 12, preferably in such a way that the light rays from the tube 10 will impinge on the surface of the reflector 17 and be reflected therefrom at an angle of about 90°. My reflector is made of a piece of plain glass and has a nonmetallic reflecting surface which I accomplish preferably by producing a high polish on the front side of the reflector.

The reflector thus formed is entirely transparent and preferably has the maximum light transmitting properties. In line with the central portion of the reflector the plate 17 and the bracket 16 are provided with a sight opening 18 which is preferably circular in shape and is of a size slightly larger than the pupil of the average person's eye.

In use, the operator holds this device up to one eye and sights through the opening 18 with the reflector 17 pointed towards the patient. The light from the bulb 11 is reflected by the member 17 to the eye of the patient and reflected back to the eye of the observer as is done in the ordinary type of retinoscope. Due to the fact that my reflector 17 has a continuous reflecting surface on its forward side there will be no false image cast upon the patient's eye and because of the fact that the sight opening 18 is slightly larger than the observer's pupil, he will receive the full image from the patient's eye without having to squint or in other ways strain his own optical system.

In Figure 3, I have shown another form of retinoscope which comprises a glass disc 17 having a highly polished surface 19 on its front side and provided on its back with an opaque plate 20 having a peripheral flange 21 surrounding the edge of the reflector 17. The plate 20 has a center aperture 22 which corresponds with the sight opening 18 of the other form hereinbefore described. A suitable handle member 23 is adapted to carry the plate 20 and its enclosed reflector 17.

In use, this second form of the invention has the source of light arranged behind the head of the patient, preferably to one side or above the same and the retinoscope is suitably tilted by the operator to reflect the light from the source into the patient's eye, thereupon the observer makes his usual examination through the opening 22.

The glass 17 has a reflecting factor $m$ which is the ratio of the light reflected by the mirror to that striking the mirror $\left(\frac{I_2}{I_1}\right)$, and which increases with the angle of incidence according to known laws, but which does not reach its maximum until nearly grazing incidence is a condition. Therefore, it will be evident that in the reflecting surface there will be a certain amount of loss so that the reflected light beam $I_2$ is equal to $I_1 \times m$. (See Figure 1.)

The patient has a returned factor $K$ which is the ratio of the light reflected by the eye to that received by it $\left(\frac{I_3}{I_2}\right)$ and which is known to those skilled in the art, so that the image reflected back to the observer is less than $I_2$. More specifically, $I_3$ equals $K I_1 m$ and the image $I_4$ which reaches the observer is less than $I_3$ because of the fact that there are certain losses in passing from the reflector 17. Clear glass from which I prefer to make my reflector 17 has a transmitting factor of about 92%, that is, it transmits about 92% of the light striking it, so that $I_4$ equals $.92 K I_2$ which is more than twice as good as in the prior art retinoscopes.

With my device, the eye of the patient is made the basis of the work and the maximum of light from the patient's eye reaches the observer's eye, which is very desirable as has been previously pointed out. There is no false shadow cast upon the patient's eye because of the fact that the surface of the reflector is continuous. From this it will be seen that I have produced a highly desirable and simple retinscope which will be economical to manufacture, efficient in use and a general improvement in the art.

Another most important advantage is that the eye of the patient is not dazzled by an excess light as in other forms of retinoscopes since so much larger percentage of light from the patient's eye reaches the observer's eye. The efficiency of a retinoscope is measured by the per cent of amount of light leaving the patient's eye which can reach the observer's eye if no obstruction intervenes. If we call this 100%, my retinoscope has an efficiency of 92% (the reflections from both sides of the clear glass crown mirror) while the usual forms have an efficiency of perhaps 10% to 25%. This prevents nerve shock to the patient and increases accuracy of results.

Obviously, slight changes may be resorted to and I reserve the right to make such changes falling within the scope of the appended claims without departing from the spirit of my invention.

I claim:

1. In a diagnostic instrument for throwing a beam of light into a patient's eye, a support having a sight opening larger than the pupil of the human eye and a transparent reflecting member secured to the support in alignment with the said opening, the side of the reflecting member removed from the support being highly polished and having a continuous reflecting surface whereby the light reflected from the patient's eye will convey the whole image to the observer's eye without shadow.

2. In a diagnostic instrument for throwing a beam of light into a patient's eye, a support having a sight opening of substantially the size of the pupil of the human eye and a transparent reflecting member secured to the support in alignment with the said opening, the side of the reflecting member removed from the support being highly polished and having a continuous reflecting surface whereby the light reflected from the patient's eye will convey the whole image to the observer's eye without shadow.

EDGAR D. TILLYER.